United States Patent [19]

Bradley

[11] Patent Number: 5,868,881
[45] Date of Patent: Feb. 9, 1999

[54] ROTARY AIR COUPLING FOR TIRE INFLATION SYSTEM

[75] Inventor: John Allen Bradley, Natalia, Tex.

[73] Assignee: Equalaire Systems, Inc., Corpus Christi, Tex.

[21] Appl. No.: 708,330

[22] Filed: Sep. 4, 1996

[51] Int. Cl.[6] .................................................. B60C 23/00
[52] U.S. Cl. .......................................................... 152/417
[58] Field of Search ............................. 152/415, 416, 152/417

[56] References Cited

U.S. PATENT DOCUMENTS 1,800,780  4/1931  Daneel ..................................... 152/417

Primary Examiner—Francis J. Lorin
Attorney, Agent, or Firm—Fulbright & Jaworski

[57] ABSTRACT

The present invention is directed to a rotary air coupling that distributes air to tires mounted on a rotating hub of a driven axle. The coupling is positioned outside of the axle and hub bearings avoiding interference with the wheel assembly. And the rotary coupling is connected to the brake mounting plate and the wheel hub to take advantage of their closely held tolerances.

8 Claims, 5 Drawing Sheets

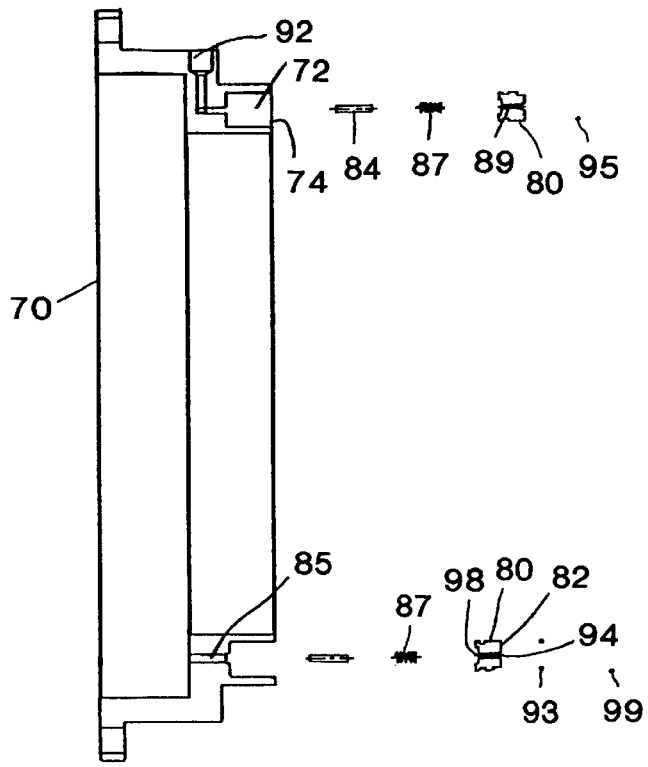
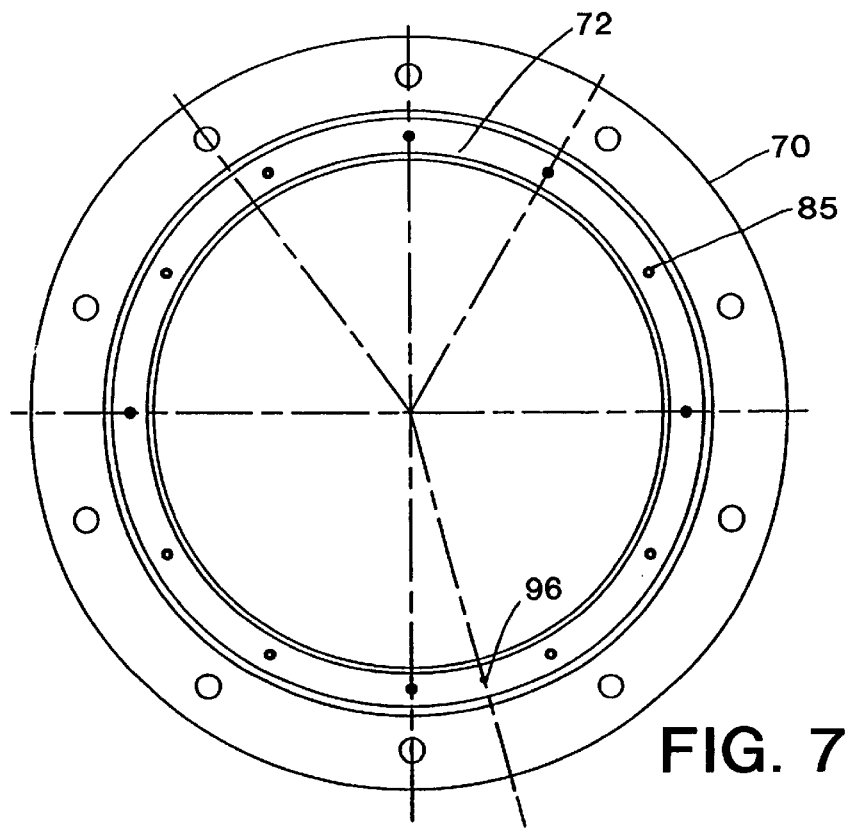

ROTARY AIR COUPLING FOR TIRE INFLATION SYSTEM

BACKGROUND OF THE PRESENT INVENTION

The present invention is directed to a rotary air coupling that provides a means to distribute air from an air supply to vehicle tires mounted on a rotating hub of a vehicle drive axle.

Automatic tire inflation systems (ATIS) are becoming popular with the trucking industry. Various types of ATIS systems have been developed, both for trailer axles and tractor drive axles. Existing air distribution systems for tire inflation systems on drive axles direct the supply air through the bearings of the hub. Distribution through the bearings demand smaller bearings and require additional seals in the hub. The seal life is shortened due to the increased seal friction caused by pressure loading of the seal lips.

The present invention is particularly directed to a rotary air coupling designed to distribute supply air to the tires mounted on drive axles in which the air coupling is positioned externally of the drive axle and the hub bearings. Therefore, the improved rotary air coupling of the present invention by being mounted outside the bearings of the hub have no effect on existing hub bearings.

However, a rotary air coupling, which includes a stationary seal and a rotating seal must be accurately positioned relative to each other and therefore requires small tolerances, such as five to ten thousands of an inch. Generally, the tolerances in wheel assemblies on an axially driven truck are quite large and thus are not suitable mounting surfaces. However, one set of surfaces in a wheel assembly that are tightly controlled is the relationship between the brake shoes and the brake drum. The present improved rotary air coupling takes advantage of this controlled dimension by connecting the stationary component of the coupling to the brake mounting plate directly or through the axle housing, while the rotary component of the coupling is connected to the hub and thus to the brake drum, such as by being attached to the wheel lugs of the hub.

One of the advantages of the present invention is that the rotary coupling of the present invention does not interfere with the drive axle, bearings or lubrications as internal axle type air couplings can. Thus, there is no interference in the strength of existing vehicle components which can lead to lengthy testing delays demanding by OEMs. Another advantage is the accessibility of the present rotary coupling. The present rotary coupling can be accessed as easily as brake shoes and will not cause mechanical difficulty in reassembly.

SUMMARY

The present invention is directed to an improvement in a rotary air coupling in a tire inflation system having a driven axle, a hub rotatable on hub bearings, a brake mounting plate, and a brake drum connected to the hub. The coupling includes an annular stationary housing positioned externally of the hub bearings, and connected to the brake mounting plate, and an annular rotatable housing positioned externally of the hub bearings and connected to the hub. Seal means are provided sealing between the stationary housing and the rotatable housing. An air supply inlet is connected to the stationary housing, and an air outlet is connected to the rotatable housing. The stationary housing and the rotatable housing include an air passageway therethrough communicating between the air inlet and the air outlet. The seal means may be annular seals outside and inside of the passageway.

The present invention is further directed to the improvement in an air inflation system for tires on a vehicle having a driven axle with at least one pneumatic tire at each end of the axle, a hub rotatable on hub bearings, a brake mounting plate, and a brake drum connected to the hub of a rotary air coupling which distributes supply air to the tires. The rotary air coupling includes an annular stationary seal housing having a seal chamber with an axially facing opening in which the stationary housing is positioned externally of the hub bearings and connected to the brake mounting plate. The coupling also includes an annular rotatable seal housing having a seal chamber with an axially facing opening and the rotatable housing is positioned externally of the hub bearings and connected to the hub. The axially facing opening of the stationary seal housing and the axially facing opening of the rotatable seal housing are positioned adjacent to and face each other. A stationary ring seal is provided having a sealing face and is positioned in the seal chamber of the stationary housing with the sealing face adjacent the stationary housing chamber opening and the stationary ring seal is provided with limited axial movement. Also provided is a rotatable ring seal having a sealing face and positioned in the seal chamber of the rotatable housing with its sealing face adjacent to the rotatable housing chamber opening and the rotatable ring seal is provided with limited axial movement.

An air supply inlet is connected to the stationary seal housing and in communication with the stationary ring seal. An air outlet is connected to the rotatable seal housing and is in communication with the rotatable ring seal. The sealing face of the stationary ring seal is in sealing engagement with the sealing face of the rotary ring seal. And the stationary ring seal and the rotatable ring seal include an air passageway extending through both sealing faces and rings for conducting air from the air supply inlet to the air outlet.

Still a further object of the present invention is the provision of biasing means acting on at least one of the seal rings preventing parting of the sealing faces of the seal rings and compensating for axial and eccentric misalignment when mated.

Still a further object of the present invention is wherein the air passageway includes an annular groove in at least one of the seal faces allowing the supply air to be transmitted from the stationary ring seal to the rotatable ring seal when the rotatable ring seal is in any radial position.

Yet a still further object of the present invention is wherein the seal housings are metallic and thus serve as heat sinks.

Yet a further object of the present invention is wherein the seal chambers each form an annular air manifold.

A still further object includes seal means on the outside diameter and the inside diameter of each seal ring.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 6 is an exploded cross-sectional view of the annular rotatable seal housing and rotatable seal ring, and FIG. 7 is a side elevational view of the rotatable seal housing of FIG. 6.

DESCRIPTION OF THE PREFERRED EMBODIMENT

It is known, as disclosed in U.S. Pat. No. 5,377,736, to provide an automatic central tire inflation system (ATIS) in which the air and rotating tires is controlled through an air connection between the trailer air supply and each of the tires on a driven axle and such a disclosure is incorporated herein by reference.

Figure 1:
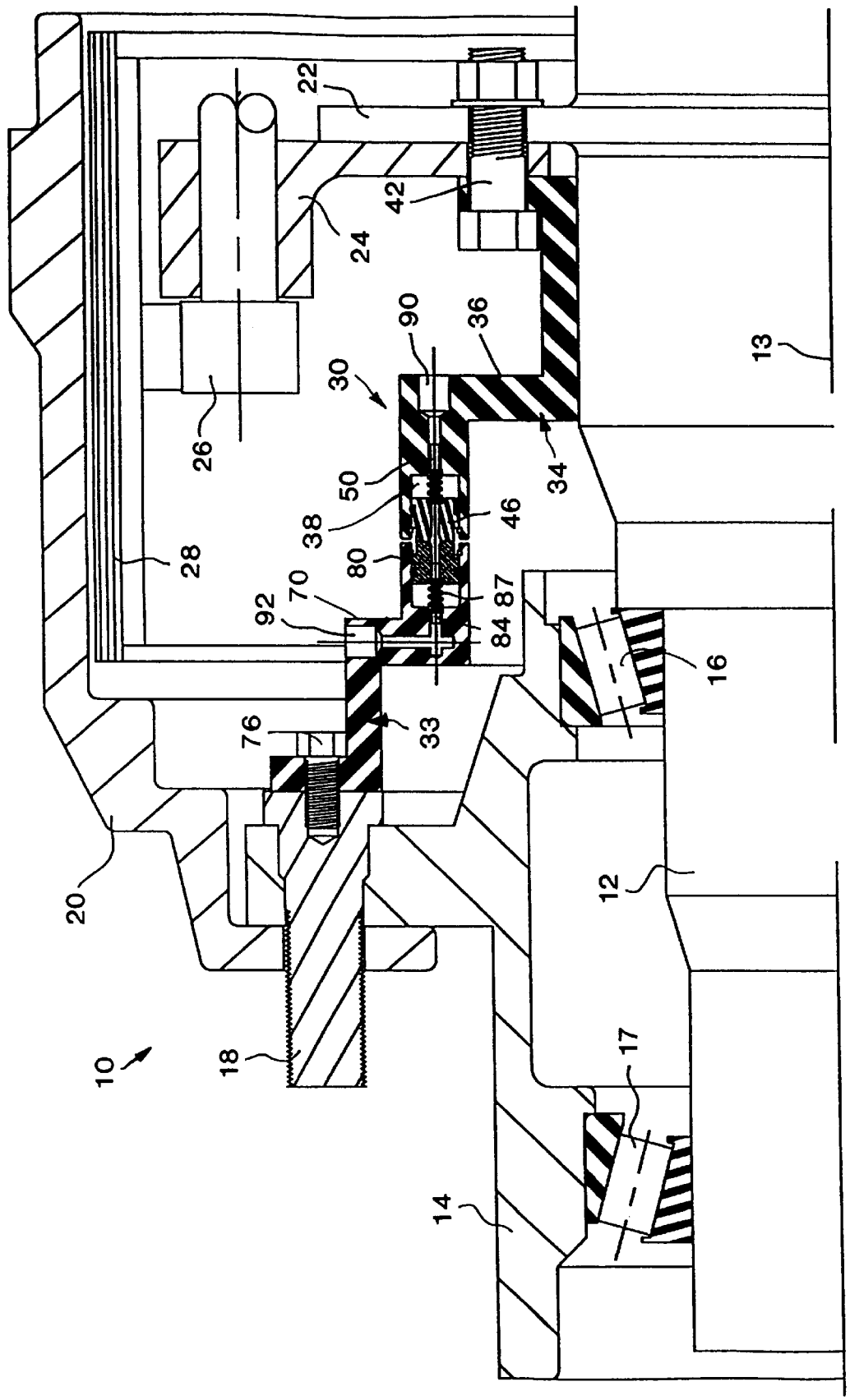
FIG. 1 is a half cross-sectional view of a driven axle type of wheel assembly with the rotary air coupling of the present invention.

Referring now to FIG. 1, the reference numeral 10 generally indicates a wheel assembly of a driven axle vehicle having a driven axle or spindle 12 having an axis 13 in which a wheel hub 14 is supported therefrom by bearings 16 and 17. Lug bolts 18 extend from the hub 14 for receiving and supporting a wheel and tire (not shown), and a brake drum 20, all of which rotates. A stationary component includes a brake mounting plate 22 to which is connected the brake spider 24, the brake S cam 26 and the brake shoe 28. The above components of the wheel assembly 10 are conventional.

The present invention is directed to providing a rotary air coupling generally indicated by the reference numeral 30 to distribute supply air from an air supply on the vehicle to tires mounted on the drive axle or spindle 12. Existing air distribution systems for tire inflation systems on drive axles direct the supply air through the bearings of the hub which require smaller bearings, additional seals, which causes the seal life to be shortened.

One of the features of the present rotary coupling 30 is that it does not interfere with the conventional drive axle 12, bearings 16 and 17 or lubrication as do internal type axle couplings. Therefore, there is no interference in the strength of existing vehicle components. It is noted from FIG. 1 that the rotary air coupling 30 of the present invention is positioned around the outside of the axle 12 and externally of the hub bearings 16 and 17. However, the present air coupling 30 consists of a rotary or dynamic component 33 and a stationary or static component 34. It is important that the components 33 and 34 be closely aligned with tight tolerances, for example, five to ten thousands of an inch. However, generally speaking, the various components in the wheel assembly 10 have variable and loose tolerances such a quarter of an inch or even greater. Nevertheless, the tolerances between the brake drum 20 and the brake shoe 28 must be maintained with close tolerances which requires that the tolerances between the brake mounting plate 22 and the hub 14 is a well defined dimensional relationship since the other brake members are interconnected from the brake mounting plate 22 and hub 14. Therefore, it is another feature of the present invention to support the stationary components 34 and the rotating component 33 of the coupling 30 from the brake mounting plate 22 and the hub 14, respectively, thereby allowing the components 33 and 34 to maintain the required close tolerances between themselves.

Referring now to FIGS. 1–5, the stationary component 34 includes an annular stationary seal housing 36 having a seal chamber 38 which has an axially facing opening 40. The stationary seal housing 36 is positioned externally of the hub bearing 16 and 17 and the axle 12, and is connected to the brake mounting plate 22 and supported therefrom such as by bolts 42. A stationary ring seal 46 having a sealing face 48 is positioned in the seal chamber 38 with the sealing face 48 adjacent the stationary housing chamber opening 40. The seal 46 is confined in the seal chamber 38 but the chamber 38 allows axial movement of the seal 46. In order to rotationally secure the ring seal 46 in the chamber 38, but allow axial movement, a plurality of dowel pins 50 are provided which longitudinally engage holes 52 in the housing 36 and holes 54 in the ring seal 46. Biasing means such as springs 56 bias the ring seal 46 outwardly. An external seal 58 and an internal seal 60 are provided between the ring seal 46 and the stationary housing 36 providing a pressure barrier seal between the seal ring 46 and the housing 36. A retainer ring 62, such as a C-ring, limits the outward movement of the seal ring 46.

Figure 2:
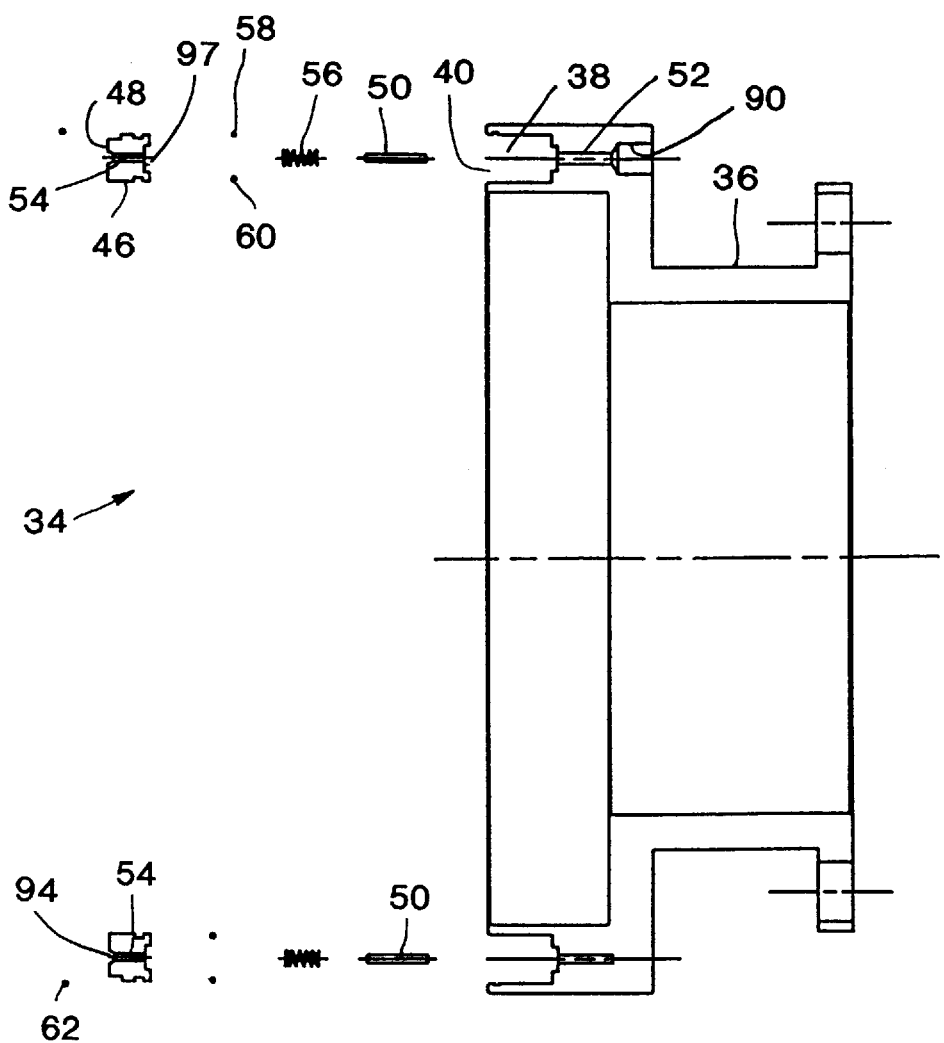
FIG. 2 is an exploded cross-sectional view of the annular stationary seal housing and stationary ring seal.
Figure 3:
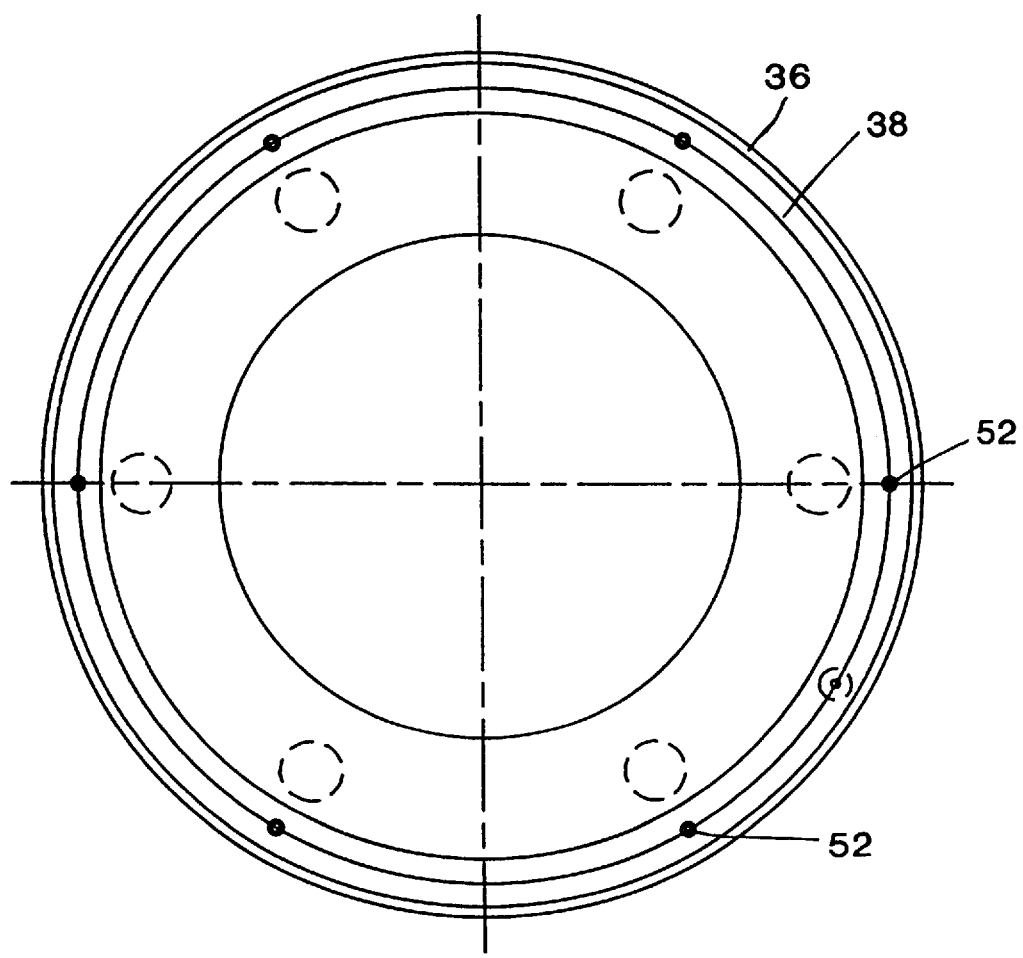
FIG. 3 is a side elevational view of the stationary seal housing of FIG. 2.
Figure 4:
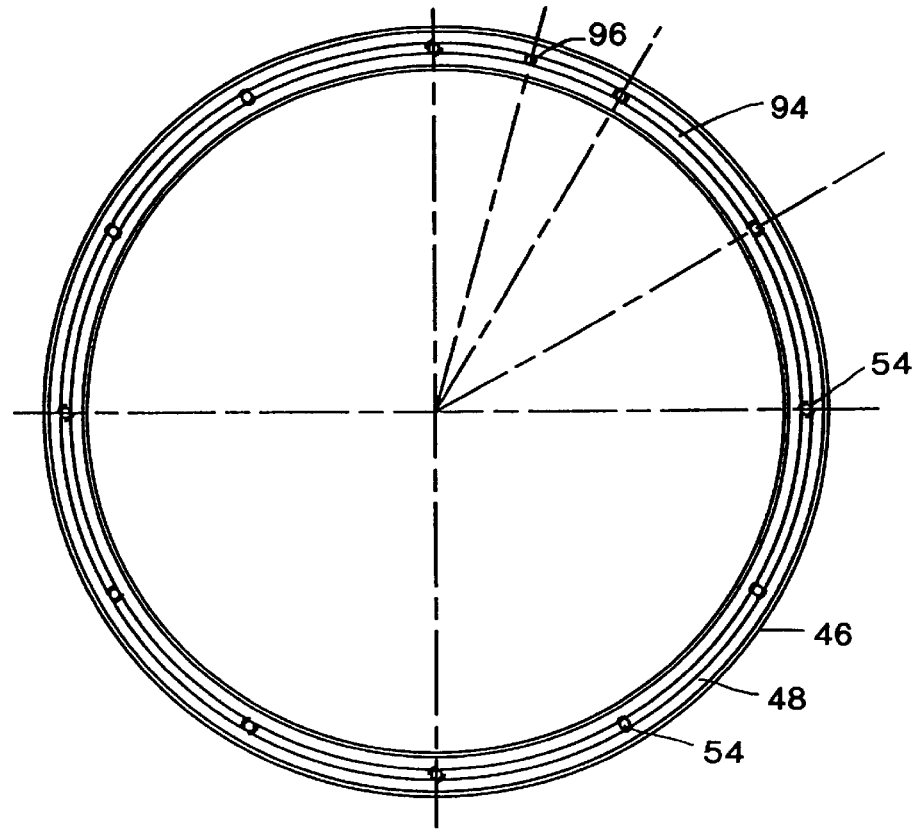
FIG. 4 is a side elevational view of the stationary seal ring.
Figure 5:
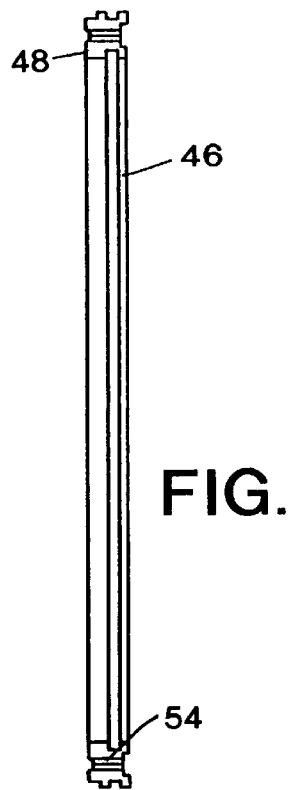
FIG. 5 is a cross-sectional view of the ring of FIG. 4.

Referring now to FIGS. 1, 6 and 7, the rotating components 33 of the present coupling 30 include an annular rotatable seal housing 70 having a seal chamber 72 with an axially facing opening 74. The rotatable housing 70 is positioned externally of the hub bearings 16 and 17 and the axle 12 and is connected to the hub 14 by bolts 76 connected to the wheel mounting lugs 18. A rotatable seal ring 80 having a sealing face 82 with the sealing face 82 of the rotatable ring 80 being positioned adjacent to the rotatable housing chamber opening 74. The rotatable seal ring 80 is a mirror image of the stationary ring seal 46 of FIGS. 4 and 5. The rotatable ring 70 is positioned in the chamber 72, but is provided with limited axial movement therein. The ring 80 is supported in the housing 70 by dowel pins 84 engaging holes 85 in the housing 70 and holes 89 in the ring seal 80 and is spring-biased outwardly by springs 87. A retainer ring 99, such as a C-ring, limits the outward movement of the seal ring 80. External seal 93 and internal seal 95 provide a pressure barrier seal between the seal ring 80 and housing 70. It is to be noted from FIG. 1 that the seal chamber 38 in the stationary housing 36 and the seal chamber 72 in the rotatable housing 33 are positioned adjacent each other with the openings 74 and 40 facing each other and are mirror images of each other. This allows the sealing face 48 of the stationary ring 46 to be in sealing engagement with the sealing face 82 of the rotatable seal ring 80 as they are biased relative to each other by the springs 56 and 87, respectively. Referring to FIGS. 1 and 2, an air supply inlet 90 is connected to the stationary seal housing 36 and is adapted to be connected to the air supply on the vehicle thereby placing air in communication with the backside of the stationary seal ring 46.

And referring to FIGS. 1 and 6, an air outlet 92 is connected to the rotatable seal housing 33 and is adapted to be connected by lines to the pneumatic tires (not shown) and is in communication with the back of the rotatable ring seals 80. The stationary ring seal 46 and the rotatable ring seal 80 include an air passageway extending through both sealing faces 48 and 82 for transmitting air from the air supply 90 to the air outlet 92. Preferably, one or both of the seal faces 48 and 82 include an annular groove 94 which allows air to be transmitted through the ring seals 46 and 80 while the rotatable component 33 is in any radial position. Air may flow through the ring seals 46 and 80 through the holes through which the dowel pins 50 and 84 extend, such as the holes 52, 54, 89, and 85 and into the annular groove 94. If desired, one or more additional holes 96 (FIGS. 4 and 6) may be provided in each of the seal rings 46 and 80, which holes do not include dowel pins.

Preferably, the seal housings 33 and 34 are metallic, such as aluminum, to conduct heat away from the seal rings 46 and 80. The seal rings 46 and 80 may be of any suitable material. In the preferred embodiment, one of the rings is metallic and the other is carbon or graphite. The pressure areas of sealing faces 48 and 82 and piston faces 97 (FIG. 2) and 98 (FIG. 7) provide equal and balanced sealing faces. The springs 56 and 87 provide the additional force to maintain the seal across the stationary seat 46 and the rotating seat 80. In addition, the springs 56 and 87 press their faces together, and compensate for any axial and eccentric misalignment of the seal rings. It is noted that the seal chambers 38 and 72 provide an annular air manifold connected to the air inlet 90 and the air outlet 92, respectively.

In operation, the present air coupling may be conveniently located outside of the axle and connected to known dimension parts, such as the brake mounting plate 22 and hub 14 by the bolts 42 and 76, respectively, with the assurance that the tolerances of these available mounting services are always tightly controlled because it is important that the brake shoes 28 be aligned with the drum 20. This location also has the advantage of accessibility. The coupling 30 does not interfere with the drive axle 10, bearings 16 and 18, or lubrication. The rotary union 30 can be accessed as easily as the brakeshoes and may be easily reassembled and there is no interference with the existing vehicle components. An air line is connected to the vehicle air supply and connected to the inlet connection 90 to provide a supply air for supplying to the rotatable tires. Suitable air lines are connected between the tires and the outlet 92.

Therefore, as the wheels rotate, air from the air supply flows through the inlet, into the chamber 48, through the seal rings 46 and 80, while their seal faces 48 and 82 prevent escape of the air, into the chambers 72, and out of the outlet connection 92 to the tires.

The present invention, therefore, is well adapted to carry out the objects and attain the ends and advantages mentioned as well as others inherent therein. While a presently preferred embodiment of the invention has been given for the purpose of disclosure, numerous changes in the details of construction, and arrangement of parts will be readily apparent to those skilled in the art and which are encompassed within the spirit of the invention and the scope of the appended claims.

What is claimed is:

1. In an air inflation system for tires on a vehicle having a driven axle with at least one pneumatic tire at each end of the axle, a hub rotatable on hub bearings, a brake mounting plate, and a brake drum connected to the hub, said brake mounting plate and said hub accurately positioned relatively to each other, the improvement in a rotary air coupling comprising, an annular stationary seal housing having a seal chamber having an axially facing opening, said stationary housing positioned externally of the hub bearings, and connected to the brake mounting plate, an annular rotatable seal housing having a seal chamber having an axially facing opening, said rotatable housing positioned externally of the hub bearings, and connected to the hub whereby the stationary housing and the rotatable housing are accurately positioned relatively to each other, said axially facing opening of the stationary seal housing and the axially facing opening of the rotatable seal housing positioned adjacent and facing each other, a stationary ring seal having a sealing face and positioned in the seal chamber of the stationary housing with the sealing face adjacent the stationary housing chamber opening, said stationary ring seal having limited axial movement, a rotatable ring seal having a sealing face and positioned in the seal chamber of the rotatable housing with sealing face of the rotatable seal adjacent to the rotatable housing chamber opening, said rotatable ring seal having limited axial movement, an air supply inlet connected to the stationary seal housing and in communication with the stationary ring seal, an air outlet connected to the rotatable seal housing and in communication with the rotatable ring seal, said sealing face of the stationary ring seal being in sealing engagement with the sealing face of the rotatable ring seal, and said stationary ring seal and said rotatable ring seal including an air passageway extending through both sealing faces and rings for conducting air from the air supply inlet to the air outlet.

2. The apparatus of claim 1 including, biasing means acting on at least one of said seal rings pressing the seal faces together.

3. The apparatus of claim 1 wherein the air passageway includes an annular groove in at least one of the seal faces.

4. The apparatus of claim 1 wherein seal housings are metallic.

5. The apparatus of claim 1 including wherein the seal chambers each form an annular air manifold.

6. The apparatus of claim 1 including seal means on the outside diameter and the inside diameter of each seal ring.

7. In an inflation system for tires on a vehicle having a driven axle with at least one pneumatic tire at each end of the axle, a hub rotatable on hub bearings, a brake mounting plate, and a brake drum connected to the hub, said brake mounting plate and said hub accurately positioned relative to each other, the improvement in a rotary air coupling comprising, an annular stationary housing having a seal chamber having an axially facing opening and positioned externally of the hub bearings, and connected to the brake mounting plate, an annular rotatable housing having a seal chamber having an axially facing opening and positioned externally of the hub bearings and connected to the hub whereby the stationary housing and the rotatable housing are accurately positioned relatively to each other, an air supply inlet connected to the stationary housing, an air outlet connected to the rotatable housing, said axially facing opening of the stationary seal housing and the axially facing opening of the rotatable seal housing adjacent and facing each other, a stationary ring seal having a sealing face and positioned in the seal chamber of the stationary housing, a rotatable ring seal having a sealing face and positioned in the seal chamber of the rotatable housing, at least one of the ring seals being axially movable and the sealing face of the stationary ring seal being in sealing engagement with the sealing face of the rotatable ring seal, and said stationary ring seal and said rotatable ring seal including an air passageway extending through both sealing faces and rings for conducting air from the air supply inlet to the air outlet.

8. The apparatus of claim 7 wherein the annular stationary housing is supported solely from the brake mounting plate and the annular rotatable housing is supported solely from the hub.

* * * * *